United States Patent
Scoda

(10) Patent No.: US 10,282,401 B2
(45) Date of Patent: May 7, 2019

(54) METHODS FOR PROCESSING CASCADING STYLE SHEETS AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

(*) Notice: Subject to any disclaimer, the term of this patent is extended or adjusted under 35 U.S.C. 154(b) by 329 days.

(21) Appl. No.: 13/798,844

(22) Filed: Mar. 13, 2013

(65) Prior Publication Data
US 2014/0281923 A1  Sep. 18, 2014

(51) Int. Cl.
G06F 17/22 (2006.01)
G06F 17/30 (2006.01)

(52) U.S. Cl.
CPC ...... G06F 17/227 (2013.01); G06F 17/30905 (2013.01)

(58) Field of Classification Search
CPC .. G06F 17/227; G06F 17/2264; G06F 17/211; G06F 17/30914; G06F 17/30896
See application file for complete search history.

(56) References Cited

U.S. PATENT DOCUMENTS

| | | | |
|---|---|---|---|
| 6,463,440 B1 * | 10/2002 | Hind ................ | G06F 17/30905 707/758 |
| 6,589,291 B1 | 7/2003 | Boag et al. | |
| 6,973,625 B1 * | 12/2005 | Lupo ..................... | G06F 8/38 715/744 |
| 7,134,073 B1 | 11/2006 | Fiedorowicz et al. | |
| 7,574,486 B1 * | 8/2009 | Cheng ............... | G06F 17/30905 707/999.01 |
| 7,574,487 B1 * | 8/2009 | Ravishankar .......... | H04M 3/12 379/265.09 |
| 2004/0225959 A1 * | 11/2004 | D'Orto ................ | G06F 17/211 715/230 |

(Continued)

FOREIGN PATENT DOCUMENTS

| | | |
|---|---|---|
| CN | 102637135 A * | 8/2012 |
| WO | 2005003998 A1 | 1/2005 |

OTHER PUBLICATIONS

Paolo (WO 2001075678 A1 System and method for evaluating an optimizing web site attributes), pp. 1-20, published Oct. 2001.*

(Continued)

Primary Examiner — Stephen S Hong
Assistant Examiner — Ahamed I Nazar
(74) Attorney, Agent, or Firm — Pepper Hamilton LLP

(57) ABSTRACT

A method, non-transitory computer readable medium, and apparatus that processes cascading style sheets includes receiving a Hypertext Transfer Protocol (HTTP) request for a web page from a client computing device. A type of browser from which the HTTP request originated is identified based on a user agent header included in the HTTP request. At least one cascading style sheet (CSS) associated with the requested web page is obtained. The at least one CSS including a CSS property comprising at least a prefix followed by a name. A determination is made whether the prefix of the CSS property matches an established value. A transformation function for the CSS property is applied, when it is determined that the prefix of the CSS property matches the established value. The modified web page is sent to the requesting client computing device.

18 Claims, 3 Drawing Sheets

(56) References Cited

U.S. PATENT DOCUMENTS

| | | | | |
|---|---|---|---|---|
| 2004/0268231 | A1* | 12/2004 | Tunning | G06F 17/2247 715/236 |
| 2005/0034066 | A1* | 2/2005 | Ahlert | G06F 17/218 715/236 |
| 2005/0050454 | A1* | 3/2005 | Jennery | G06F 17/30905 715/235 |
| 2006/0230344 | A1* | 10/2006 | Jennings | G06F 17/30899 715/201 |
| 2006/0236223 | A1* | 10/2006 | Aubert | G06F 17/30905 715/205 |
| 2007/0220480 | A1* | 9/2007 | Waldman | G06F 17/2264 717/106 |
| 2007/0220599 | A1* | 9/2007 | Moen | H04L 63/0227 726/12 |
| 2008/0139191 | A1* | 6/2008 | Melnyk | G06F 17/30905 455/419 |
| 2009/0019378 | A1* | 1/2009 | Kelkar | G06F 17/2247 715/760 |
| 2009/0070485 | A1* | 3/2009 | Barger | G06F 17/27 709/236 |
| 2009/0112824 | A1* | 4/2009 | Fu | G06F 17/30905 |
| 2009/0300483 | A1* | 12/2009 | Viet | G06F 17/227 715/236 |
| 2011/0225488 | A1* | 9/2011 | Schluter | G06F 8/51 715/239 |
| 2011/0314091 | A1* | 12/2011 | Podjarny | G06F 17/30905 709/203 |
| 2012/0173967 | A1* | 7/2012 | Lillesveen | G06F 17/227 715/235 |
| 2012/0278700 | A1* | 11/2012 | Sullivan | G06F 17/227 715/235 |
| 2013/0111324 | A1* | 5/2013 | Kern | G06F 17/218 715/230 |
| 2013/0166777 | A1* | 6/2013 | Chen | H04M 1/72522 709/246 |
| 2013/0167001 | A1* | 6/2013 | De Angelis | G06F 17/30861 715/211 |
| 2014/0040445 | A1* | 2/2014 | Beckert | H04L 67/2823 709/223 |

OTHER PUBLICATIONS

European Search Report for European Patent Application No. 14159461.4 (dated Jun. 25, 2014).

* cited by examiner

METHODS FOR PROCESSING CASCADING STYLE SHEETS AND DEVICES THEREOF

FIELD

This technology generally relates to methods, non-transitory computer readable medium, and apparatuses for processing cascading style sheets (CSSs) included in web pages and, more particularly, for reducing the amount of code required to define CSSs.

BACKGROUND

Cascading style sheets (CSSs) are used by software developers to define the format, appearance, and/or layout of web pages or to define media associated with web pages, such as animations. The interpretation of the properties of CSS code is browser-specific. For compatibility, developers often include multiples of each property and the rendering web browser utilizes only the properties it recognizes. An exemplary CSS code fragment 300 is illustrated in FIG. 3 as including six CSS properties 302(1)-302(6). The CSS properties 302(1)-302(4) are used by WebKit-based web browsers, the CSS property 302(5) is used by Mozilla Firefox™ web browsers, and the CSS property 302(6) is used by standards-compliant web browsers to define the "rounded_border" class attribute.

Due to the multiple properties, defining CSSs can require a large amount of code, which may be complex and/or difficult to maintain. Communicating and rendering web pages with CSSs can also require a relatively large amount of resources and time. Additionally, the implementations required for compatibility are exposed to the client computing devices, which may not be desirable.

SUMMARY

A method for processing cascading style sheets includes receiving at a web content proxy server a Hypertext Transfer Protocol (HTTP) request for a web page from a client computing device. A type of browser from which the HTTP request originated is identified with the web content proxy server based on a user agent header included in the HTTP request. At least one cascading style sheet (CSS) associated with the requested web page is obtained with the web content proxy server. The at least one CSS including a CSS property comprising at least a prefix followed by a name. A determination is made whether the prefix of the CSS property matches an established value with the web content proxy server. A transformation function for the CSS property is applied with the web content proxy server, when it is determined that the prefix of the CSS property matches the established value. The transformation function is configured to modify the web page to replace the CSS property based on the identified type of browser and the name of the CSS property. The modified web page is sent with the web content proxy server to the requesting client computing device.

A non-transitory computer readable medium having stored thereon instructions for processing cascading style sheets including machine executable code which when executed by a processor, causes the processor to perform steps including receiving an HTTP request for a web page from a client computing device. A type of browser from which the HTTP request originated is identified based on a user agent header included in the HTTP request. At least one cascading style sheet (CSS) associated with the requested web page is obtained. The at least one CSS including a CSS property comprising at least a prefix followed by a name. A determination is made whether the prefix of the CSS property matches an established value. A transformation function for the CSS property is applied, when it is determined that the prefix of the CSS property matches the established value. The transformation function is configured to modify the web page to replace the CSS property based on the identified type of browser and the name of the CSS property. The modified web page is sent to the requesting client computing device.

A web content proxy server apparatus includes a memory coupled to a processor which is configured to execute programmed instructions stored in the memory comprising receiving as HTTP request for a web page from a client computing device. A type of browser from which the HTTP request originated is identified based on a user agent header included in the HTTP request. At least one cascading style sheet (CSS) associated with the requested web page is obtained. The at least one CSS including a CSS property comprising at least a prefix followed by a name. A determination is made whether the prefix of the CSS property matches an established value. A transformation function for the CSS property is applied, when it is determined that the prefix of the CSS property matches the established value. The transformation function is configured to modify the web page to replace the CSS property based on the identified type of browser and the name of the CSS property. The modified web page is sent to the requesting client computing device.

This technology provides a number of advantages including methods, non-transitory computer readable medium, and apparatuses that reduce the amount and complexity of code required to define web page CSSs. With this technology, developers can include a prefix to indicate that a CSS property should be transformed server-side to be compatible with a web browser of a client computing device that originated the request for the web page with the CSS. Accordingly, CSS code can be optimized and web pages with CSSs can be communicated relatively quickly to requesting client computing devices.

DETAILED DESCRIPTION

Figure 1:
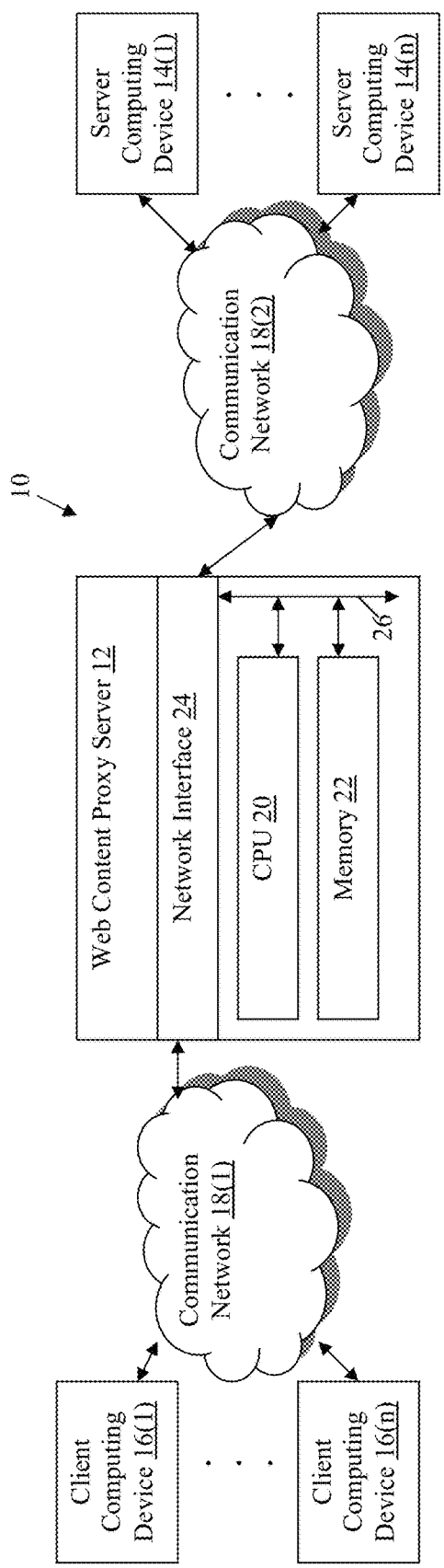
FIG. 1 is a block diagram of a network environment which incorporates an exemplary web content proxy server.

An exemplary network environment 10 is illustrated in FIG. 1 as including an exemplary web content proxy server 12. In this example, the web content proxy server 12 is coupled to a plurality of server computing devices 14(1)-14(n) and a plurality of client computing devices 16(1)-16(n) by communication networks 18(1) and 18(2), although other types and numbers of devices, components, and elements in other topologies could be used. This technology provides a number of advantages including methods, non-transitory computer readable medium, and apparatuses for more efficiently processing cascading style sheets (CSSs) of a web page based on the web browser originating the request for the web page and without requiring that the web page include multiple properties of the CSS for compatibility.

Referring more specifically to FIG. 1, the web content proxy server 12 includes at least one processor or central processing unit (CPU) 20, a memory 22, and a network interface 24, which are coupled together by a bus 26 or other link, although other numbers and types of components, parts, devices, systems, and elements in other configurations and locations can also be used. The processor 20 in the web content proxy server 12 may execute a program of stored instructions one or more aspects of the present invention, as described and illustrated by way of the embodiments herein, although the processor 20 could execute other numbers and types of programmed instructions.

The memory 22 in the web content proxy server 12 stores these programmed instructions for one or more aspects of the present invention as described and illustrated herein, although some or all of the programmed instructions could be stored and/or executed elsewhere. A variety of different types of memory storage devices, such as a RAM or a ROM in the system or a floppy disk, hard disk, CD ROM, DVD ROM, or other non-transitory computer readable medium which is read from and/or written to by a magnetic, optical, or other reading and/or writing system that is coupled to the processor 20, can be used for the memory 22 in the web content proxy server 12.

The network interface 24 in the web content proxy server 12 is used to operatively couple and communicate between the web content proxy server 12 and the client devices 16(1)-16(n) and server devices 14(1)-14(n) via the communication networks 24(1) and 24(2), although other types and numbers of networks with other types and numbers of connections and configurations can also be used. For example, one or more of the communication networks 24(1) and 24(2) can include one or more networks, such as one or more local area networks (LANs) and/or wide area networks (WANs) such as the Internet. By way of example only, the communication networks can use TCP/IP over Ethernet and industry-standard protocols, including Hypertext transfer protocol (HTTP), secure HTTP (HTTPS), wireless application protocol (WAP), and/or SOAP, although other types and numbers of communication networks having their own communications protocols, can also be used.

Generally, the server computing devices 14(1)-14(n) process requests for web pages and other web content received from the client computing devices 16(1)-16(n) via the communication networks 18(1) and 18(2) according to the HTTP-based protocol, for example, although the server computing devices 14(1)-14(n) can also provide other numbers and types of functions. Each of the server computing devices 14(1)-14(n) can include a at least one processor or CPU, a memory, and a network interface, which are coupled together by a bus or other link, although each of the server computing devices 14(1)-14(n) could have other numbers and types of components, parts, devices, systems, and elements in other configurations. The processor in each of the server computing devices 14(1)-14(n) executes a program of stored instructions for one or more aspects of the present invention, as described and illustrated by way of the embodiments herein, although the processor could execute other numbers and types of programmed instructions.

The memory in each of the server computing devices 14(1)-14(n) stores these programmed instructions for one or more aspects of the present invention, as described and illustrated herein, although some or all of the programmed instructions could be stored and/or executed elsewhere. A variety of different types of memory storage devices, such as a RAM or a ROM in the system or a floppy disk, hard disk, CD ROM, DVD ROM, or other non-transitory computer readable medium which is read from and/or written to by a magnetic, optical, or other reading and/or writing system that is coupled to the processor, can be used for the memory in each of the server computing devices 14(1)-14(n).

The network interface in each of the server computing devices 14(1)-14(n) is used to operatively couple and communicate between the server computing devices 14(1)-14(n) and the web content proxy server 12 and client computing devices 16(1)-16(n) via the communication networks 24(1) and 24(2), although other types and numbers of communication networks with other types and numbers of connections and configurations can be used. Each of the server computing devices 16(1)-16(n) may be hardware or software or may represent a system with multiple servers in a pool, which may include internal or external networks. In this example the each of the server computing devices 16(1)-16(n) may be any version of Microsoft® IIS server or Apache® server, although other types of servers may be used.

The client computing devices 12(1)-12(n) enable a user to request, receive, and interact with applications, web services, and content hosted by the server computing devices 14(1)-14(n) through the web content proxy server 12 via the communication networks 24(1) and 24(2), although one or more of the client computing devices 12(1)-12(n) could access content and utilize other types and numbers of applications from other sources and could provide a wide variety of other functions for the user. By way of example only, the client computing devices 12(1)-12(n) can be smart phones, personal digital assistants, or computers.

In this example, each of the client computing devices 16(1)-16(n) includes at least one processor or a CPU, a memory, a network interface, a user input device, and a display, which are coupled together by a bus or other link, although one or more of client computing devices 16(1)-16(n) can include other numbers and types of components, parts, devices, systems, and elements in other configurations. The processor in each of the client computing devices 16(1)-16(n) can execute a program of instructions stored in the memory of each of the client computing devices 16(1)-16(n) for one or more aspects of the present invention as described and illustrated herein, although the processor could execute other numbers and types of programmed instructions.

The memory in each of the client computing devices 16(1)-16(n) stores these programmed instructions for one or more aspects of the present invention, as described and illustrated herein, although some or all of the programmed instructions could be stored and/or executed elsewhere. A variety of different types of memory storage devices, such as a RAM or a ROM in the system or a floppy disk, hard disk, CD ROM, or other non-transitory computer readable medium which is read from and/or written to by a magnetic, optical, or other reading and/or writing system that is coupled to processor can be used for the memory in each of the client computing devices 16(1)-16(n). Each of the client computing devices 16(1)-16(n) can be configured to access web services and content through a web browser stored in the memory.

The network interface in each of the client computing devices 16(1)-16(n) is used to operatively couple and communicate between each of the client computing devices 16(1)-16(n) and the web content proxy server 12 and server computing devices 12(1)-12(n) via the communication networks 18(1) and 18(2), although other types and numbers of communication networks with other types and numbers of connections and configurations can be used.

The user input device in each of the client computing devices 16(1)-16(n) can be used to input selections, such as a request for a particular web page, although the user input device could be used to input other types of requests and data and interact with other elements. The user input device in each of the client computing devices 16(1)-16(n) can include a keypad, touch screen, and/or vocal input processing system, although other types and numbers of user input devices can also be used.

The display in each of the client computing devices 16(1)-16(n) can be used to show data and information to the user, such as a requested web page by way of example only. The display in each of the client computing devices 16(1)-16(n) can be an LCD, LED, or OLED display, for example, although other types and numbers of displays could be used depending on the particular type of client computing device 16(1)-16(n).

Although embodiments of the web content proxy server 12, client computing devices 16(1)-16(n), and server computing devices 14(1)-14(n) are described and illustrated herein, each of the web content proxy server 12, client computing devices 16(1)-16(n), and server computing devices 14(1)-14(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s). Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
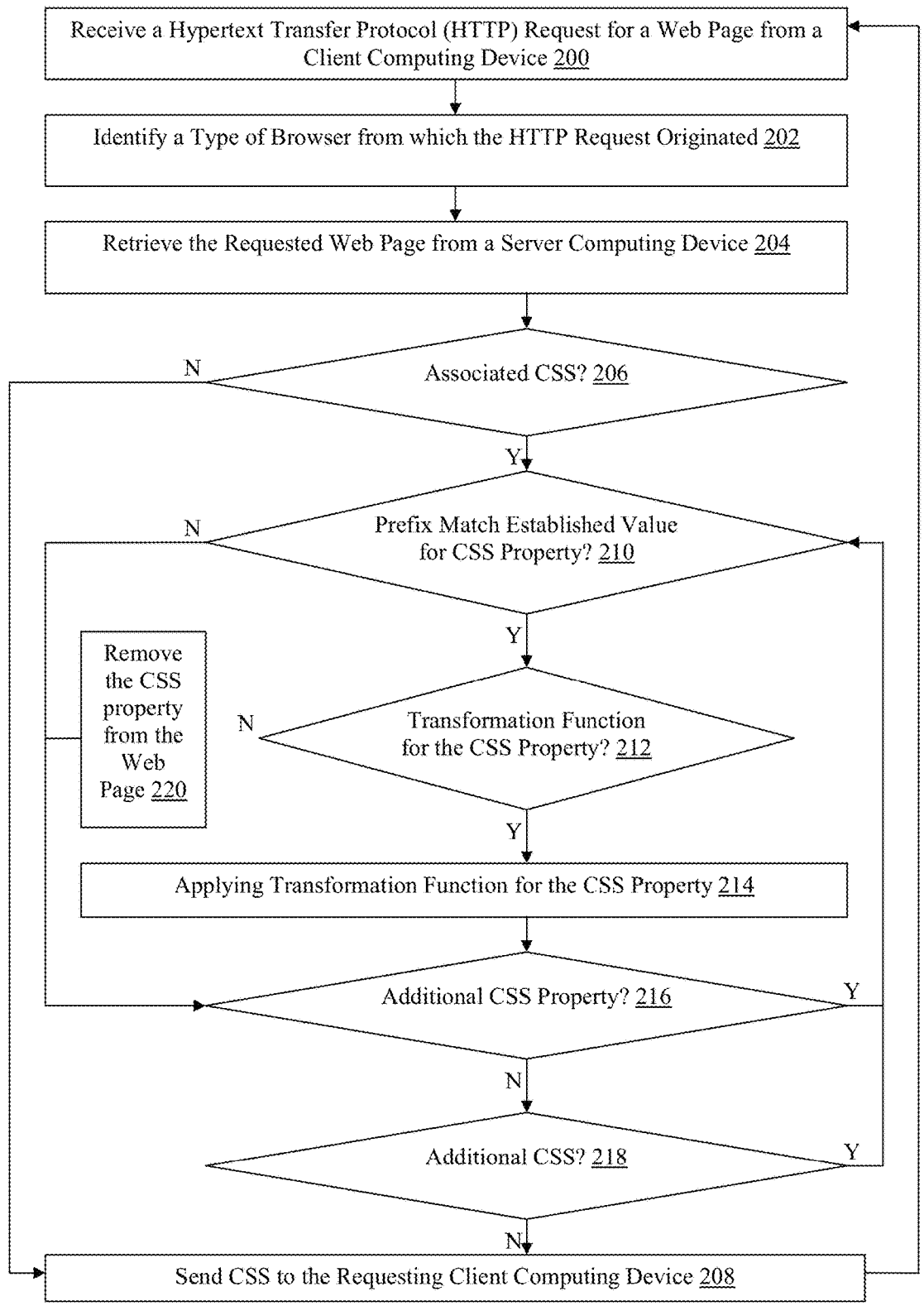
FIG. 2 is a flowchart of an exemplary method for processing a cascading style sheet (CSS) included in a web page.

An exemplary method for processing cascading style sheets (CSSs) included in a web page will now be described with reference to FIGS. 1-7. Referring specifically to FIG. 2, in step 200, the web content proxy server 12 receives a Hypertext Transfer Protocol (HTTP) request for a web page from one of the client computing devices 16(1)-16(n) via the communication network 18(1).

In step 202, the web content proxy server 12 identifies a type of web browser from which the HTTP request received in step 200 originated. In this example, the HTTP request can include a user agent header which includes information regarding the originating web browser including at least the type of the web browser. In step 204, the web content proxy server 12 retrieves the requested web page from one of the server computing devices 14(1)-14(n), although the web page could be retrieved from other types of computing devices.

In step 206, the web content proxy server 12 determines whether the retrieved web page has an associated CSS. In this example the CSS is included in the source code for the web page. However, in other examples, the web page source code references a separate external file which includes a CSS. In examples in which a CSS is defined in a separate file, the initially-requested web page source code may cause a web browser of the requesting one of the client computing device 16(1)-16(n) to submit a request for the file. The web content proxy server 12 can parse the web page or the file retrieved from the one of the server computing devices 14(1)-14(n) to identify character strings associated with a CSS included therein, for example, although other methods of determining whether the web page has an associated CSS can also be used.

If the web content proxy server 12 determines that the retrieved web page does not have an associated CSS, then the No branch is taken to step 208. In step 208, the retrieved web page is sent to the requesting one of the client computing devices 16(1)-16(n). Optionally, the web content proxy server 12 can perform other optimizations on the web page prior to forwarding the web page to the requesting one of the client computing devices 16(1)-16(n), such as optimizing the web page for display on a mobile computing device, for example.

Referring back to step 206, if the web content proxy server 12 determines that the retrieved web page does have an associated CSS, then the Yes branch is taken to step 210. In step 210, the web content proxy server 12 determines whether a prefix of one of the CSS properties of the CSS matches an established value. The established value can be set by an administrator and stored in the memory 22 of the web content proxy server 12, for example. The established value can also be shared with web page developers. If the web content proxy server 12 determines that the prefix of the CSS property does match the established value, then the Yes branch is taken to step 212.

Figure 3:
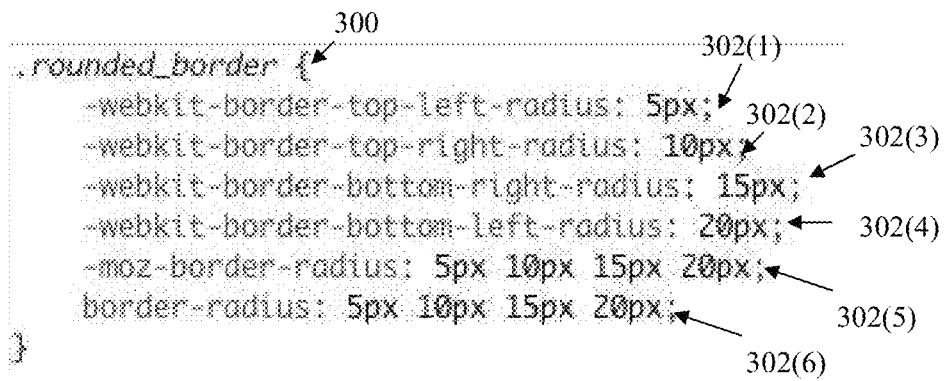
FIG. 3 is an exemplary cascading style sheet (CSS) code fragment defining a class attribute for a plurality of web browsers.
Figure 4:
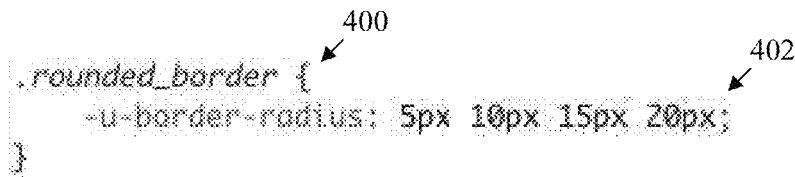
FIG. 4 is an exemplary CSS code fragment defining the class attribute of FIG. 3 and including a CSS property with an exemplary prefix indicating that the property requires transformation.

Referring to FIG. 4, an exemplary CSS code fragment 400 defining the "rounded_border" class attribute of FIG. 3 is illustrated. In this example, the CSS code fragment 400 includes a CSS property 402 with a "-u-" prefix. In this example, the "-u-" prefix matches the established value, although the established value can be any value that does not match a prefix used by a web browser (e.g. "-webkit-" or "-moz-").

Referring back to FIG. 2, in step 212, the web content proxy server 12 determines whether a transformation function is stored in the memory 22 for the CSS property based on the type of web browser identified in step 202 and a name of the CSS property (e.g. "border-radius" of the CSS property 402). In this example, the web content proxy server 12 can store transformation functions for a plurality of CSS properties and a plurality of web browsers. The transformation functions are configured to modify the web page to replace a CSS property with one or more CSS properties that are recognized by the web browser of the requesting one of the client computing devices 16(1)-16(n) and that provide equivalent functionality. If the web content proxy server 12 determines that there is a transformation function for the CSS property and the identified type of web browser, then the Yes branch is taken to step 214.

Figure 5:
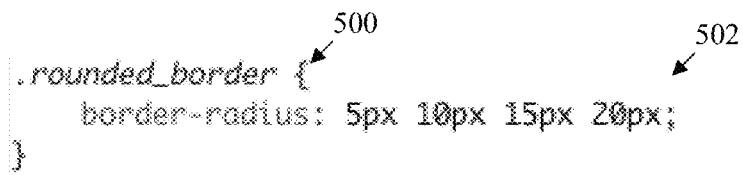
FIG. 5 is an exemplary CSS code fragment defining the class attribute of FIG. 3 and including the CSS property of FIG. 4 transformed for a standards-compliant web browser.
Figure 6:
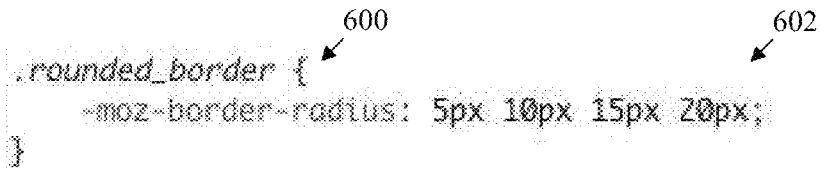
FIG. 6 is an exemplary CSS code fragment defining the class attribute of FIG. 3 and including the CSS property of FIG. 4 transformed for a Mozilla Firefox™ web browser.
Figure 7:
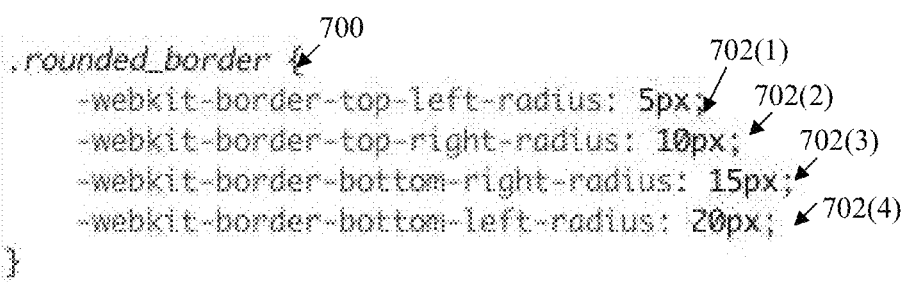
FIG. 7 is an exemplary CSS code fragment defining the class attribute of FIG. 3 and including the CSS property of FIG. 4 transformed for a WebKit-based web browser.

In step 214, the web content proxy server 12 applies the transformation function to the CSS property of the web page. Referring to FIGS. 5-7, exemplary CSS code fragments 500, 600, and 700 defining the "rounded_border" class attribute of FIG. 3 are illustrated. The CSS code fragments 500, 600, and 700 include the CSS property 402 of FIG. 4 transformed for a standards-compliant, Mozilla Firefox™, and WebKit-based type of web browser, respectively, into the CSS properties 502, 602, and 702. Although one example of a transformation and web browser is illustrated and described here, other types of transformations and other types web browsers can also be used.

In the examples shown in FIGS. 5-7, the applied transformations replace the prefix of the CSS property, but in another example one or more of the CSS property prefix, name, or value (e.g. "5px 10px 15px 20px" of the CSS property 402) can be removed, replace, or modified. Additionally, the CSS property 402 is an example of a CSS rule, but the CSS property can also be a CSS extension function or any other type of CSS statement or declaration.

In step 216, the web content proxy server 12 determines whether there is an additional CSS property included in the CSS. For example, the CSS can include multiple class attributes having at least one CSS property and/or one or more class attributes with multiple CSS properties. If the web content proxy server 12 determines that the CSS includes an additional CSS property, then the Yes branch is taken to step 210. Optionally, in this example steps 210-214 would be repeated for each CSS property included in the CSS.

If in step 216 the web content proxy server 12 determines that there is no additional CSS property, then the No branch is taken to step 218. In step 218, the web content proxy server 12 determines whether the retrieved web page includes an additional CSS. If the web content proxy server 12 determines that there is an additional CSS, then the Yes branch is taken to step 210. Optionally, in this example steps 210-216 would again be repeated for each additional CSS included in the retrieved web page.

If, in step 218, the web content proxy server 12 determines there is no additional CSS, then the No branch is taken to step 208. In step 208, the web page, which may have come from step 206 or may have been modified based on any transformation functions applied in step 214, is sent to the requesting one of the client computing devices 16(1)-16(n).

Referring back to step 210, if the web content proxy server 12 determines that the prefix of the CSS property does not match the established value, then the No branch is taken to step 216. In step 216, the web content proxy server 12 determines whether the CSS includes an additional CSS property, as described and illustrated earlier.

Additionally, referring back to step 212, if the web content proxy server 12 determines that there is not a transformation function for the CSS property and the identified type of web browser, then the No branch is optionally taken to step 220. In step 220, the web content proxy server 12 removes the CSS property from the retrieved web page. Since the CSS property includes a prefix matching an established value and that the web browser of the requesting one of the client computing devices 16(1)-16(n) will not recognize, the CSS property will not be interpreted by the web browser and can be removed. Once removed, the web content proxy server 12 determines, in step 216, whether the CSS includes an additional CSS property, as described and illustrated earlier.

Accordingly, as illustrated and described herein this technology provides a number of advantages including improved methods, non-transitory computer readable medium, and apparatuses for reducing the amount of code required to define web page CSSs. With this technology, developers can indicate, using an established prefix value, CSS properties that are to be transformed to be compliant with a web browser from which a request for the web page included the CSS originated. Thereby, developers can define web page CSSs using less and simpler code, which can advantageously be optimized server-side for each requesting web browser.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for processing cascading style sheets implemented by one or more web content proxy servers, the method comprising:
   receiving a Hypertext Transfer Protocol (HTTP) request for a web page from a client computing device;
   identifying a type of browser from which the HTTP request originated based on a user agent header included in the HTTP request;
   obtaining source code for at least one cascading style sheet (CSS) associated with the web page, the source code including a CSS property;
   comparing a prefix of the CSS property to an established prefix value to determine when the prefix of the CSS property matches the established prefix value, wherein the CSS property comprises the prefix followed by a CSS property name and one or more CSS property values;
   applying a transformation function for the CSS property server-side and prior to sending the web page to the client computing device, the transformation function configured to modify the CSS source code to replace the CSS property based on the identified type of browser and the CSS property name while maintaining the CSS property values in the CSS source code, when the determining indicates that the prefix of the CSS property matches the established prefix value; and sending the web page with the modified CSS source code to the client computing device.

2. The method as set forth in claim 1, further comprising:
determining when there is a transformation function for the CSS property based on the identified type of browser and the name of the CSS property, when the determining indicates that the prefix of the CSS property matches the established prefix value; and
removing the CSS property, when the determining indicates that there is not a transformation function for the CSS property.

3. The method as set forth in claim 1, wherein the transformation function is further configured to replace the prefix of the CSS property.

4. The method as set forth in claim 1, further comprising:
determining when the at least one CSS includes one or more other CSS properties; and
repeating the determining when the prefix of the one or more other CSS properties matches the established prefix value and the applying the transformation function for the CSS property for each of the one or more other CSS properties prior to sending the modified CSS source code to the requesting client computing device.

5. The method as set forth in claim 1, wherein the CSS property is a CSS rule or a CSS extension function.

6. A non-transitory computer readable medium having stored thereon instructions for processing cascading style sheets comprising machine executable code which when executed by one or more processors, causes the one or more processors to:
receive a Hypertext Transfer Protocol (HTTP) request for a web page from a client computing device;
identify a type of browser from which the HTTP request originated based on a user agent header included in the HTTP request;
obtain source code for at least one cascading style sheet (CSS) associated with the requested web page, the source code including a CSS property, the CSS property comprising at least a prefix followed by a name and one or more values;
compare a prefix of the CSS property to an established prefix value to determine when the prefix of the CSS property matches the established prefix value, wherein the CSS property comprises the prefix followed by a CSS property name and one or more CSS property values;
apply a transformation function for the CSS property server-side and prior to sending the web page to the client computing device, the transformation function configured to modify the CSS source code to replace the CSS property based on the identified type of browser and the CSS property name while maintaining the CSS property values in the CSS source code, when the determining indicates that the prefix of the CSS property matches the established prefix value; and
send the web page with the modified CSS source code to the client computing device.

7. The medium as set forth in claim 6, wherein the machine executable code when executed by the one or more processors causes the one or more processors to:
determine when there is a transformation function for the CSS property based on the identified type of browser and the name of the CSS property, when the determining indicates a match between the prefix of the CSS property and the established prefix value; and
remove the CSS property, when the determining indicates that there is not a transformation function for the CSS property.

8. The medium as set forth in claim 6, wherein the transformation function is further configured to replace the prefix or one or more of the CSS property values.

9. The medium as set forth in claim 6, wherein the machine executable code when executed by the one or more processors causes the one or more processors to:
determine when the at least one CSS includes one or more other CSS properties; and
repeat the determining when the prefix of the one or more other CSS properties matches the established prefix value and the applying the transformation function for the CSS property for each of the one or more other CSS properties prior to sending the modified CSS source code to the requesting client computing device.

10. The medium as set forth in claim 6, wherein the CSS property is a CSS rule or a CSS extension function.

11. A web content proxy server apparatus, comprising a memory comprising programmed instructions stored in the memory, wherein the memory is coupled to one or more processors which are configured to execute the programmed instructions stored in the memory to:
receive a Hypertext Transfer Protocol (HTTP) request for a web page from a client computing device;
identify a type of browser from which the HTTP request originated based on a user agent header included in the HTTP request;
obtain source code for at least one cascading style sheet (CSS) associated with the requested web page, the source code including a CSS property, the CSS property comprising at least a prefix followed by a name and one or more values;
compare a prefix of the CSS property to an established prefix value to determine when the prefix of the CSS property matches the established prefix value, wherein the CSS property comprises the prefix followed by a CSS property name and one or more CSS property values;
apply a transformation function for the CSS property server-side and prior to sending the web page to the client computing device, the transformation function configured to modify the CSS source code to replace the CSS property based on the identified type of browser and the CSS property name while maintaining the CSS property values in the CSS source code, when the determining indicates that the prefix of the CSS property matches the established prefix value; and
send the web page with the modified CSS source code to the client computing device.

12. The apparatus as set forth in claim 11, wherein the one or more processors are further configured to execute the programmed instructions stored in the memory to:
determine when there is a transformation function for the CSS property based on the identified type of browser and the name of the CSS property, when the determining indicates a match between the prefix of the CSS property and the established prefix value; and
remove the CSS property, when the determining indicates that there is not a transformation function for the CSS property.

13. The apparatus as set forth in claim 11, wherein the transformation function is further configured to replace the prefix or one or more of the CSS property values.

14. The apparatus as set forth in claim 11, wherein the one or more processors are further configured to execute the programmed instructions stored in the memory to:
   determine when the at least one CSS includes one or more other CSS properties; and
   repeat the determining when the prefix of the one or more other CSS properties matches the established prefix value and the applying the transformation function for the CSS property for each of the one or more other CSS properties prior to sending the modified CSS source code to the requesting client computing device.

15. The apparatus as set forth in claim 11, wherein the CSS property is a CSS rule or a CSS extension function.

16. The method as set forth in claim 1, wherein the established prefix value that is compared to the prefix of the CSS property is not interpretable by any web browser.

17. The medium as set forth in claim 6, wherein the established prefix value that is compared to the prefix of the CSS property is not interpretable by any web browser.

18. The apparatus as set forth in claim 11, wherein the established prefix value that is compared to the prefix of the CSS property is not interpretable by any web browser.

\* \* \* \* \*